United States Patent
Fujiwara et al.

(10) Patent No.: US 10,902,633 B2
(45) Date of Patent: Jan. 26, 2021

(54) INFORMATION PROVIDING APPARATUS AND INFORMATION PROVIDING METHOD USING VIRTUAL SOUND IMAGE LOCALIZATION PROCESSING

(71) Applicant: Toshiba Tec Kabushiki Kaisha, Tokyo (JP)

(72) Inventors: Akihiko Fujiwara, Kanagawa (JP); Mika Hirama, Tokyo (JP); Masami Takahata, Tokyo (JP); Ryuichi Aoyama, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 103 days.

(21) Appl. No.: 16/179,447

(22) Filed: Nov. 2, 2018

(65) Prior Publication Data

US 2019/0147615 A1    May 16, 2019

(30) Foreign Application Priority Data

Nov. 10, 2017    (JP) .................................. 2017-217486

(51) Int. Cl.
*G06K 9/00* (2006.01)
*G06T 7/73* (2017.01)
(Continued)

(52) U.S. Cl.
CPC .......... *G06T 7/74* (2017.01); *G06Q 30/0265* (2013.01); *G10L 15/02* (2013.01); *H04R 1/02* (2013.01); *B62B 3/1424* (2013.01); *B62B 5/0096* (2013.01)

(58) Field of Classification Search
CPC ....... G06T 7/74; G06Q 30/0265; G10L 15/02; H04R 1/02; B62B 3/1424; B62B 5/0096; G01S 5/02
(Continued)

(56) References Cited

U.S. PATENT DOCUMENTS

2008/0237339 A1*  10/2008  Stawar ................. B62B 3/1408
                                                                 235/383
2013/0116960 A1*   5/2013  Weyn .................... G01S 5/0252
                                                                 702/94

(Continued)

FOREIGN PATENT DOCUMENTS

EP        2 273 443 A2    1/2011
JP      2013-008073 A    1/2013
KR      2017-0086374 A    7/2017

OTHER PUBLICATIONS

Search Report dated Jan. 31, 2019 received in corresponding European Application No. 18 20 5342.1, 9 pages.

*Primary Examiner* — Gabriel I Garcia
(74) *Attorney, Agent, or Firm* — Foley & Lardner LLP (57) ABSTRACT

An information providing apparatus including a detection unit of at least one computer, a decision unit of the at least one computer, and a sound control circuit. The detection unit detects a position and a movement direction of a moving object in an area in which an article, corresponding to information that is provided, is disposed. The decision unit decides a direction in which the information is provided to the moving object from a relationship between the position of the moving object, the movement direction of the moving object, and a position in the area of the article. The sound control circuit controls a sound output attached to the moving object to localize a sound image according to the information in the direction decided.

16 Claims, 7 Drawing Sheets

(51) Int. Cl.
   *H04R 1/02*      (2006.01)
   *G10L 15/02*     (2006.01)
   *G06Q 30/02*     (2012.01)
   *B62B 5/00*      (2006.01)
   *B62B 3/14*      (2006.01)

(58) Field of Classification Search
   USPC .......................................................... 382/103
   See application file for complete search history.

(56)                    References Cited

U.S. PATENT DOCUMENTS

| | | |
|---|---|---|
| 2013/0261964 A1 | 10/2013 | Goldman et al. |
| 2014/0114530 A1 | 4/2014 | Fitch et al. |
| 2014/0244207 A1 | 8/2014 | Hicks |
| 2015/0030159 A1 | 1/2015 | Ozcan |
| 2015/0364017 A1* | 12/2015 | Hall ................ G06Q 10/06315 340/539.13 |
| 2017/0337528 A1* | 11/2017 | Hall ....................... G06Q 20/10 |
| 2018/0328753 A1* | 11/2018 | Stenning ................ G01C 21/08 |
| 2019/0172039 A1* | 6/2019 | Kambara ......... G06Q 20/40145 |

* cited by examiner

INFORMATION PROVIDING APPARATUS AND INFORMATION PROVIDING METHOD USING VIRTUAL SOUND IMAGE LOCALIZATION PROCESSING

CROSS-REFERENCE TO RELATED APPLICATION

This application is based upon and claims the benefit of priority from Japanese Patent Application No. 2017-217486, filed in Nov. 10, 2017, the entire contents of which are incorporated herein by reference.

FIELD

Embodiments described herein relate to an information providing apparatus, and an information providing method for causing a computer to function as a computer as the information providing apparatus.

BACKGROUND

In the related art, there is an information providing apparatus which detects the position of a cart used by a shopper for carrying a commodity and displays information on the commodity displayed close to the cart on a display device attached to the cart.

However, although the shopper using the cart knows that the commodity related to the displayed information is near the cart, he/she is unable to know in which direction the cart is directed.

DETAILED DESCRIPTION

An object to be solved by at least one embodiment described herein is to provide an information providing apparatus that can easily identify the position of an article related to information from the provided information.

In at least one embodiment, an information providing apparatus includes a detection unit, a decision unit, and a sound control unit. The detection unit detects a position and a movement direction of a moving object in an area in which an article corresponding to information that is provided is disposed. The decision unit decides a direction in which the information from a relationship between the position and the movement direction of the moving object, and a position in the area of the article is provided to the moving object. The sound control unit controls a sound output unit attached to the moving object to localize a sound image according to the information in the direction decided by the decision unit.

Hereinafter, at least one embodiment of an information providing apparatus that can easily identify the position of an article related to information from provided information will be described with reference to the drawings. In at least one embodiment, in a store such as a supermarket, the information providing apparatus for providing information on a commodity to be recommended to a shopper shopping by using a cart is exemplified. In the beginning, by using FIG. 1, the layout of the store to which at least one embodiment is applied will be described.

Figure 1:
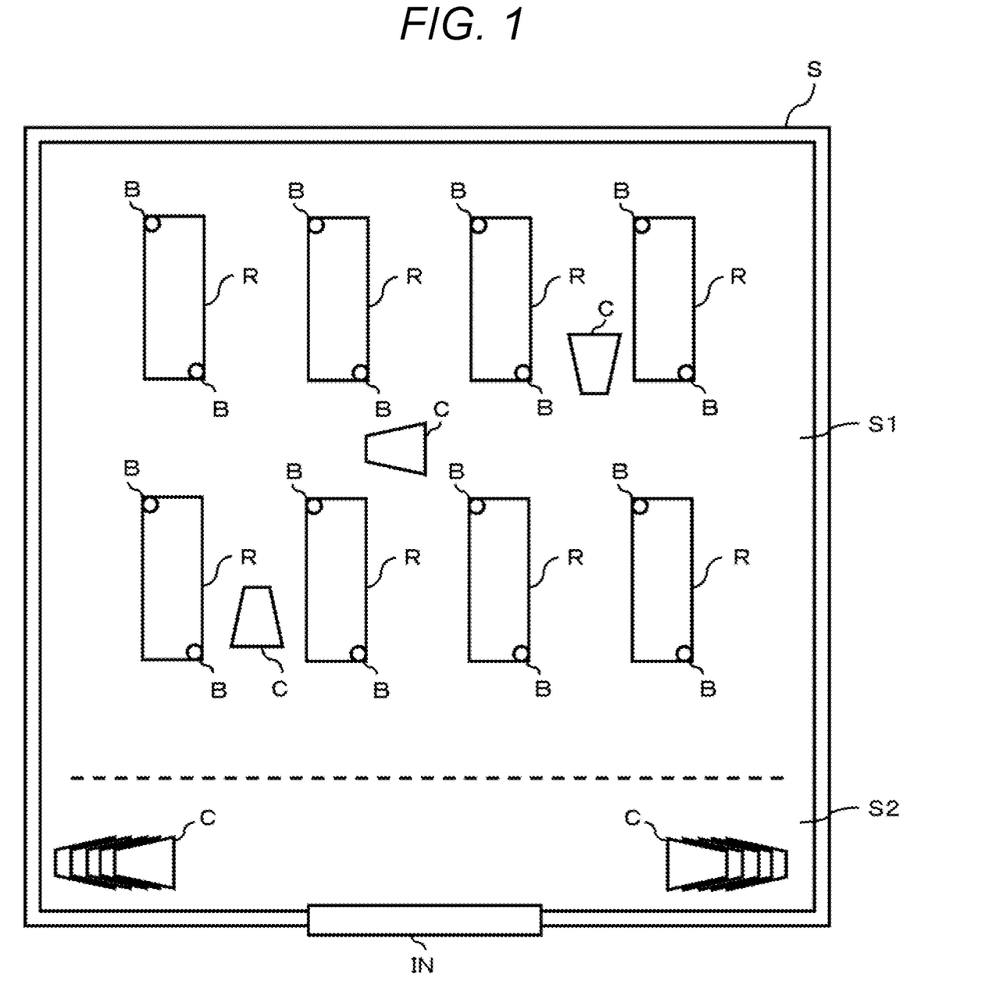
FIG. 1 is a schematic diagram illustrating a layout example of a store to which at least one embodiment is applied.

As illustrated in FIG. 1, a store S is divided into a sales place S1 in which a plurality of commodity shelves R are arranged and a cart storage place S2 near an entrance IN. The commodities which are examples of an article are displayed on each commodity shelf R. A shopper who enters through the entrance IN takes out a cart C from the cart storage place S2 and enters the sales place S1. Accordingly, the shopper turns around the sales place S1 while operating the cart C, takes out the commodity to be purchased from the commodities displayed on the commodity shelf R, and puts the commodities in a basket of the cart C. The shopper who puts the commodities in the basket is moved to an accounting place (cashier) (not illustrated) by operating the cart C, and performs accounting.

A transmitter B is attached to each commodity shelf R. In the present embodiment, among four corners of the commodity shelf R, the transmitters B are attached to a pair of corners on the same diagonal. For example, the transmitter B periodically transmits a beacon signal according to a short distance wireless communication standard such as Bluetooth (registered trademark). A unique beacon ID is included in the beacon signal. The transmitter B principally transmits the beacon signal with almost the transmission intensity. The transmitter B may intentionally change the transmission intensity according to the surrounding environment.

Meanwhile, although details will be described later, a transmission and reception circuit 104 (see FIG. 3) for receiving the beacon signal transmitted from the transmitter B is in the cart C, and the transmission and reception circuit 104 of the cart C that enters to the sales place S1 receives the beacon signal transmitted from at least one transmitter B. An attachment of the transmitter B is not limited to a layout example of the FIG. 1. As described above, the transmission and reception circuit 104 of the cart C that enters the sales place S1 may receive the beacon signal transmitted from at least one transmitter B.

Figure 2:
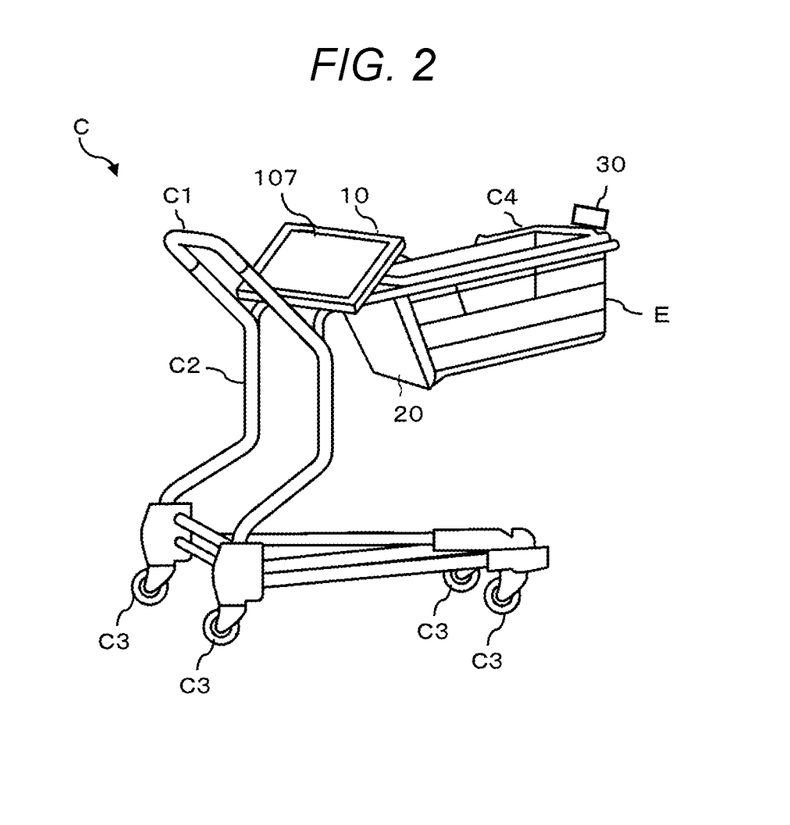
FIG. 2 is a perspective view illustrating an example of a cart used in at least one embodiment.

FIG. 2 is a perspective view illustrating an example of the cart C. The cart C in which four casters C3 are attached to a lower part of a frame C2 including a handle C1, and can be moved in front and back and left and right directions. That is, the cart C is an example of a moving body. A part of a frame C2 becomes a supporting member C4 for detachably supporting a shopping cart E. The shopper puts the commodity to be purchased from above in the shopping cart E supported to the supporting member C4.

A cart terminal 10 as an example of the information providing apparatus is attached to the frame C2 in the vicinity of the handle C1. The cart terminal 10 includes a touch panel 107, and the shopper operating the cart C with the handle C1 attaches the touch panel at a position in which an image to be displayed on the touch panel 107 can be identified.

An antenna 20 of a radio frequency identification (RFID) reader 105 (see FIG. 3) is attached to a handle C1 side of the supporting member C4. An RFID tag is attached to each commodity to be sold at the store S. A unique tag ID allocated for each RFID tag and a commodity code for recognizing the commodity to which the RFID tag is attached is stored in an IC memory of the RFID tag.

The antenna 20 transmits an inquiry signal as a radio wave to the RFID tag under the control of the RFID reader 105. The radio wave transmitted from the antenna 20 has directionality in a mounting direction of the shopping cart E. Accordingly, the radio wave is received with the RFID tag attached to the commodity that puts in the shopping cart E. The RFID tag that receives the radio wave transmits a response signal including data of the IC memory as the radio wave. The radio wave transmitted from the RFID tag is received by the antenna 20, and is output to the RFID reader 105 as the response signal. The RFID reader 105 reads the data of the IC memory, that is, the tag ID and the commodity code by demodulating the response signal.

A camera 30 that is an imaging device is attached to the opposite side to the handle C1 of the supporting member C4. The camera 30 images the movement direction (traveling direction) of the cart C. An image of the reality space imaged by the camera 30 is displayed on the touch panel 107.

Figure 3:
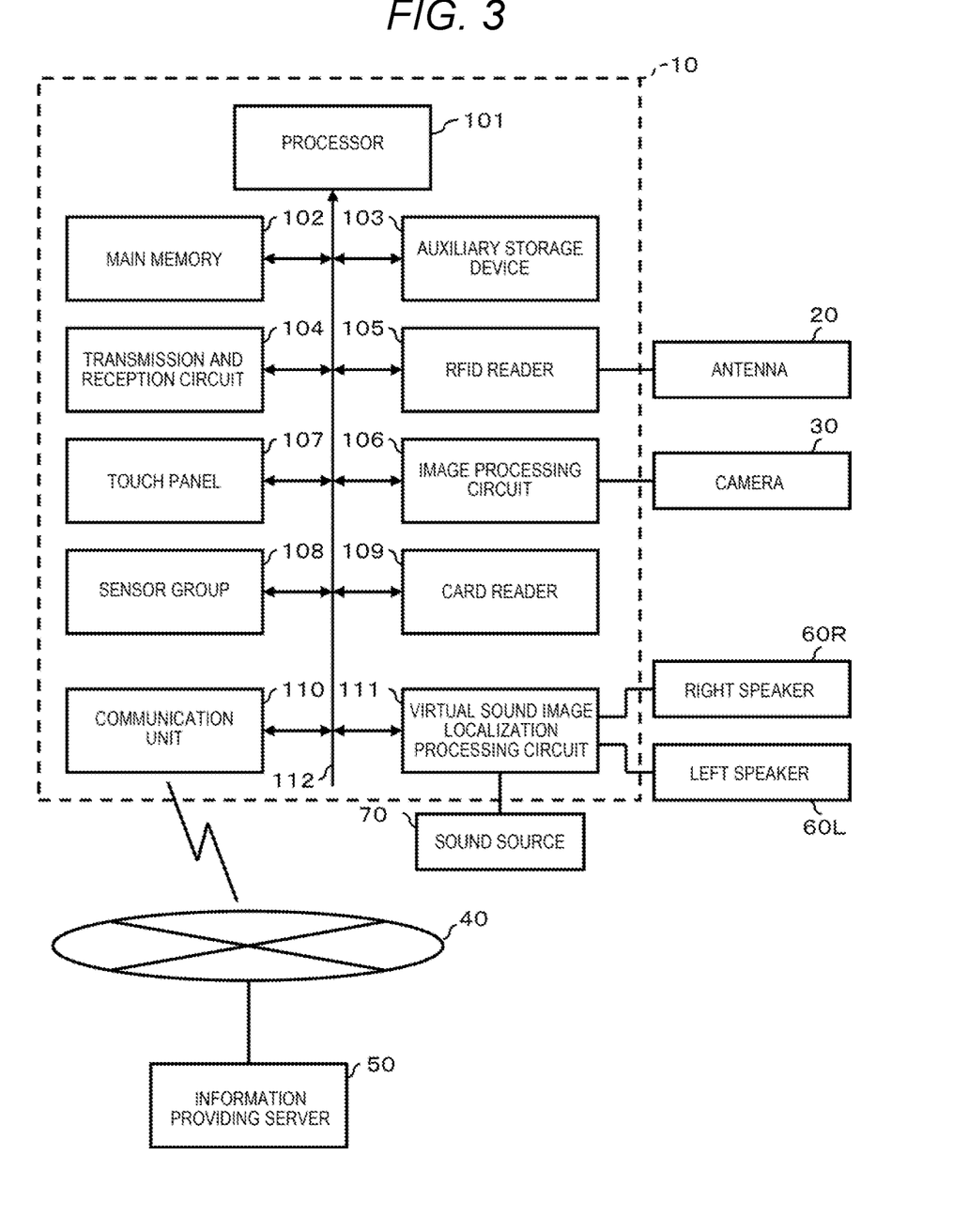
FIG. 3 is a block diagram illustrating a main circuit arrangement of a cart terminal.

FIG. 3 is a block diagram illustrating a main circuit configuration of the cart terminal 10. The cart terminal 10 includes a processor 101, a main memory 102, an auxiliary storage device 103, the transmission and reception circuit 104, the RFID reader 105, an image processing circuit 106, the touch panel 107, a sensor group 108, a card reader 109, a communication unit 110, a virtual sound image localization processing circuit 111, and a system bus 112. Accordingly, the cart terminal 10 connects the processor 101, the main memory 102, the auxiliary storage device 103, the transmission and reception circuit 104, the RFID reader 105, the image processing circuit 106, the touch panel 107, the sensor group 108, the card reader 109, the communication unit 110, and the virtual sound image localization processing circuit 111 directly to the system bus 112 or via a signal input and output circuit. In this manner, the cart terminal 10 configures a computer with the processor 101, the main memory 102, the auxiliary storage device 103, and with the system bus 112 for connecting them.

The processor 101 corresponds to the central part of the computer. The processor 101 controls each unit to realize various functions as the cart terminal 10 according to an operating system and an application program.

The main memory 102 corresponds to the main storage part of the computer. The main memory 102 includes a non-volatile memory area and a volatile memory area. The main memory 102 stores the operating system and the application program in the non-volatile memory area. In addition, there is also a case where the main memory 102 stores data required for performing a process to control each unit by the processor 101 in the non-volatile or the volatile memory area. The main memory 102 uses the volatile memory area as a work area in which data is appropriately rewritten by the processor 101.

The auxiliary storage device 103 corresponds to an auxiliary storage part of the computer. For example, an electric erasable programmable read-only memory (EEPROM), a hard disc drive (HDD), a solid state drive (SSD), and the like are used as the auxiliary storage device 103. The auxiliary storage device 103 stores data used for performing various processes by the processor 101 and data generated from the processes by the processor 101. There is also a case where the auxiliary storage device 103 stores the application program.

The transmission and reception circuit 104 receives the beacon signal transmitted from the transmitter B, and detects the beacon ID from the beacon signal. In addition, the transmission and reception circuit 104 includes a received signal strength indication (RSSI) measurement circuit for measuring the radio wave and reception intensity, and measures the radio wave and the reception intensity of the received beacon signal, so-called an RSSI value. Accordingly, the transmission and reception circuit 104 supplies the beacon ID detected from the beacon signal and the RSSI value measured by the RSSI measurement circuit to the processor 101 every time the beacon signal is received.

When the beacon ID and the RSSI value are received from the transmission and reception circuit 104, the processor 101 calculates a distance r between the transmitter B and the cart terminal 10 specified from the beacon ID based on the RSSI value by Equation (1). In Equation (1), "A" is the RSSI value measured at a position 1 meter away from radio signal of the cart terminal 10, and "B" is a constant of radio wave attenuation (theoretically two).

$$\text{RSSI}(r) = A - 10 * B/\log 10(r) \tag{1}$$

The processor 101 calculates a position of the cart terminal 10, that is, a position in sales places of the cart C by using a single piece or a plurality of pieces of distance information r. For example, when the single distance information r is used, a position of the cart C is calculated by one point positioning method. Specifically, the position of the cart C is calculated based on the transmitter B determined that it is the closest distance. When the plurality of pieces of distance information r is used, the position of the cart C is calculated by a two-point positioning method or a three-point positioning method. In a case of the two-point positioning method, a position obtained by a ratio of the distance information r on a line where two transmitters B are connected to each other, is specified as the position of the cart C. In a case of the three-point positioning method, the position of the cart C is specified by general three-point survey method. Here, a computer which is the main of the processor 101 configures a detection unit that detects the position of the cart C which is a moving object in cooperation with the transmission and reception circuit 104.

The RFID reader 105 is connected to the antenna 20. As described above, the operations of the RFID reader 105 and the antenna 20 are as described above.

The image processing circuit 106 is connected to the camera 30. The image processing circuit 106 captures in real time an image of the reality space imaged by the camera 30, and processes the captured result if necessary. The processor 101 displays the image or the processed image of the reality space captured by the image processing circuit 106 on the touch panel 107. Here, the computer which is the main of the processor 101 configures an image control unit that causes an image to be displayed on the touch panel 107 which is an image display unit attached to the cart C in cooperation with the image processing circuit 106.

The touch panel 107 functions as an input device and a display device of the cart terminal 10. As an operation mode, the cart terminal 10 has a commodity information display mode, a navigation mode, a recommendation mode, and the like. The touch panel 107 includes a button or a mode selection button for selecting one of the operation modes as the input device. The touch panel 107 may include another function button as the input device in addition to the mode selection button.

The commodity information display mode is a mode for displaying information of the commodity that puts in the shopping cart E on the touch panel 107. As described above, the cart C includes the antenna 20 of the RFID reader 105 and can read data of the RFID tag attached to the commodity that puts in the shopping cart E. When the commodity information display mode is selected, the processor 101 specifies the commodity from the data of the RFID tag, and causes commodity information such as the commodity name and a price to be displayed on the touch panel 107.

The navigation mode is a mode for displaying a map of the sales place S1 on the touch panel 107. As described above, the processor 101 can specify the current position of the cart C based on the beacon signal received by the transmission and reception circuit 104. Therefore, when the navigation mode is selected, the processor 101 causes a mark or the like indicating the current position of the cart C in the sales place S1 on the map to be displayed, and informs the shopper of the current position.

The recommendation mode is a mode for providing the information of the commodity to be recommended to the shopper who uses the cart C. The information is provided by voice. Alternatively, the information is provided by the voice and an image. There is also a case where the information is provided by only an image. When the information is provided by the voice, the processor 101 uses a sound image localization technology. That is, the processor 101 controls to hear the voice as the information from a direction in which the commodity shelf R displayed the commodities recommended to the shopper is provided. When the information is provided as the image, the processor 101 uses augmented reality (AR) technology. That is, the processor 101 controls a synthesized image obtained by synthesizing an image as the information of the commodity to be recommended with the image in the reality space imaged by the camera 30 to be displayed on the touch panel 107. At this time, an image of the commodity to be recommended are synthesized in a direction of the commodity shelf R on which the commodities are displayed.

The sensor group 108 includes a sensor used in measuring for a movement state of the cart C using technology called as a pedestrian dead reckoning (PDR). That is, the sensor group 108 includes an acceleration sensor, a gyro sensor (angular velocity sensor), a geomagnetic sensor (electronic compass), and the like. A value measured by the sensor group 108 is given to the processor 101. The processor 101 measures, based on measured values of each sensor, information on how much the cart C moves to what direction, that is, the movement direction (angle) and the amount of movement (distance) are measured in real time. Accordingly, the processor 101 generates data indicating a movement state (flow line) of the cart C by integrating the movement direction and the amount of movement. Here, the computer which is the main of the processor 101 configures the detection unit that detects the movement direction of the cart C that is the moving body in cooperation with the sensor group 108.

The card reader 109 reads data recorded in a card medium such as a point card and a membership card. A card number including a membership code for identifying a card owner is recorded in these card media. The processor 101 detects the membership code from the card number read by the card reader 109, and specifies the card owner from the membership code.

The communication unit 110 performs data communication with an information providing server 50 via a communication network 40. For example, the communication network 40 is a WiFi (registered trademark) standard wireless network, a mobile communication network, or the like. The information providing server 50 will be described below.

The virtual sound image localization processing circuit 111 connects a right speaker 60R and a left speaker 60L which are sound output units and a sound source 70. The right speaker 60R, the left speaker 60L, and the sound source 70 are provided in a case of the cart terminal 10. The right speaker 60R is provided in the vicinity of an end on the right side as seen from the shopper holding the handle C1. The left speaker 60L is provided in the vicinity of an end on the left side as seen from the shopper. The position of the right speaker 60R and the left speaker 60L is not limited in the case of the cart terminal 10. For example, the right speaker 60R and the left speaker 60L are provided at both sides of the handle C1, respectively.

The virtual sound image localization processing circuit 111 performs a virtual sound image localization process for localizing a virtual sound image at a predetermined position based on an acoustic transfer function from the position of the right speaker 60R and the left speaker 60L to a listening point of the shopper operating the cart C. Since the virtual sound image localization process is well known, the description thereof will be omitted. It is preferable that the right speaker 60R and the left speaker 60L are speakers having the directionality. By using the speaker having the directionality, it is possible to provide voice to himself/herself operating the cart C.

Figure 4:
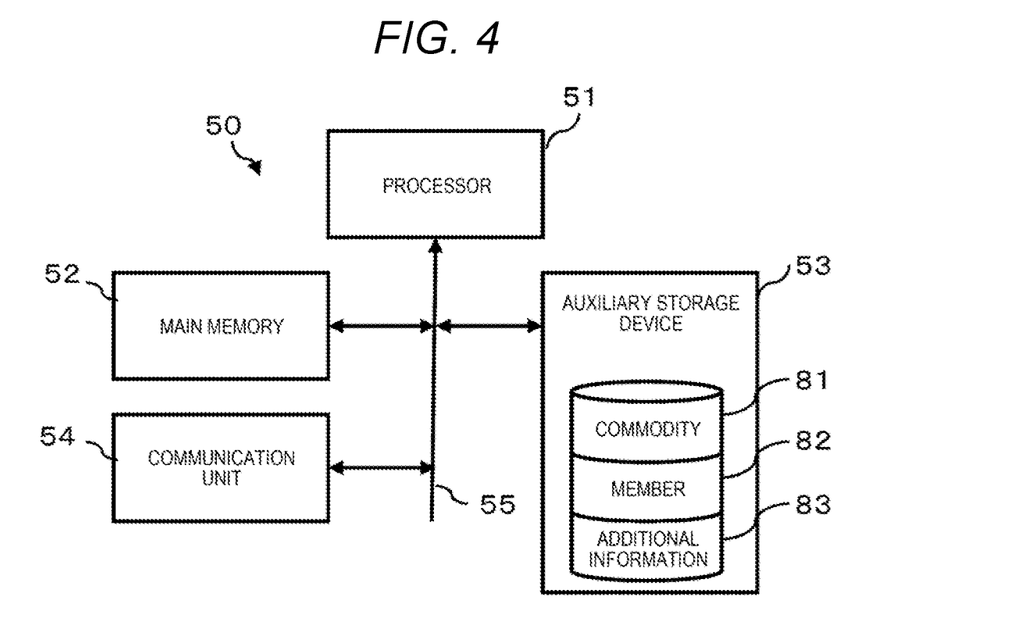
FIG. 4 is a block diagram illustrating a main circuit arrangement of an information providing server.

FIG. 4 is a block diagram illustrating a main circuit configuration of the information providing server 50. The information providing server 50 includes a processor 51, a main memory 52, an auxiliary storage device 53, a communication unit 54, and a system bus 55. Accordingly, the information providing server 50 connects the processor 51, the main memory 52, the auxiliary storage device 53, and the communication unit 54 directly to the system bus 55 or via the signal input and output circuit. In this manner, the information providing server 50 configures a computer with the processor 51, the main memory 52, and the auxiliary storage device 53, and with the system bus 55 for connecting them.

The processor 51 corresponds to the central part of the computer. The processor 51 controls each unit to realize various functions as the information providing server 50 according to an operating system and an application program.

The main memory 52 corresponds to the main storage part of the computer. The main memory 52 includes a non-volatile memory area and a volatile memory area. The main memory 52 stores the operating system and the application program in the non-volatile memory area. In addition, there is also a case where the main memory 52 stores data required for performing a process to control each unit by the processor 51 in the non-volatile or the volatile memory area. The main memory 52 uses the volatile memory area as a work area in which data is appropriately rewritten by the processor 51.

The auxiliary storage device 53 corresponds to an auxiliary storage part of the computer. For example, the EEPROM, the HDD, the SSD, and the like are used as the auxiliary storage device 53. The auxiliary storage device 53 stores data used for performing various processes by the processor 51 and data generated from the processes by the processor 51. There is also a case where the auxiliary storage device 53 stores the application program.

The communication unit 54 performs data communication to each cart terminal 10 connected via the above-described communication network 40.

The information providing server 50 such a configuration uses a part of a storage area of the auxiliary storage device 53 as the commodity database 81, the member database 82, and the additional information database 83.

Figure 5:
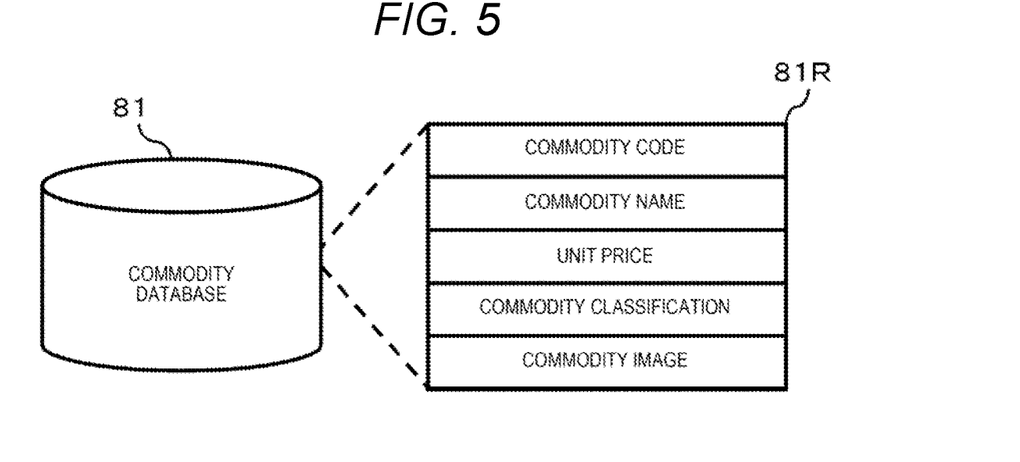
FIG. 5 is an explanatory diagram of a commodity database.

FIG. 5 is an explanatory diagram of the commodity database 81. The commodity database 81 saves a commodity record 81R in which information on the commodity to be sold in the store S is recorded, as many as the number of commodities. The commodity record 81R includes items such as a commodity code, a commodity name, a unit price, commodity classification, and a commodity image. The commodity record 81R may include other items.

Figure 6:
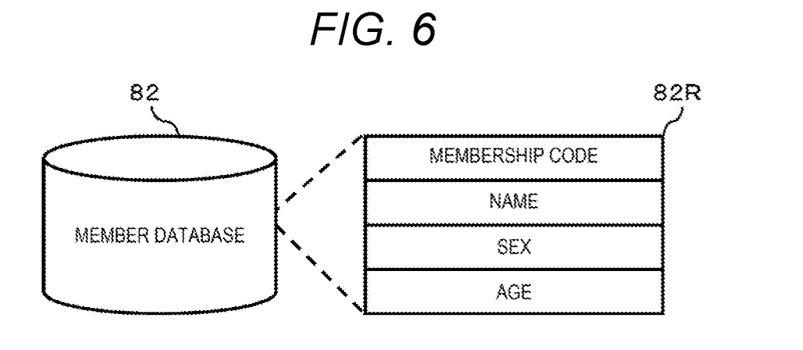
FIG. 6 is an explanatory diagram of a member database.

FIG. 6 is an explanatory diagram of the member database 82. The member database 82 saves a member record 82R in which information on a customer (card owner) to be a member of a point card membership is recorded as many as the number of members. The member record 82R includes items such as a membership code, name, sex, and age. The member record 82R may be configured by including other items.

Figure 7:
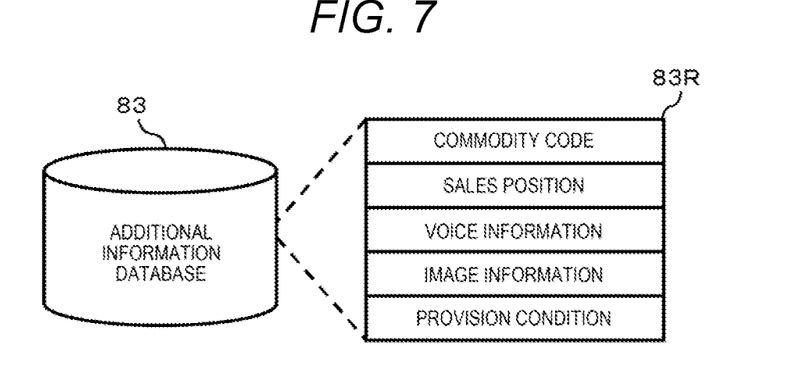
FIG. 7 is an explanatory diagram of an additional information database.

FIG. 7 is an explanatory diagram of the additional information database 83. The additional information database 83 saves an additional information record 83R in which additional information provided to the shopper operating the cart C is recorded. The additional information is information on the commodity to be recommended to the shopper. That is, the additional information database 83 records the additional information record 83R therein as many as the number of commodities to be recommended to the shopper. The additional information record 83R includes items such as a commodity code, a sales position, voice information, image information, and a provision condition. It goes without saying that the additional information record 83R maybe configured by including other items.

In the additional information record 83R, the commodity code is a code for identifying the commodity to be recommended. The commodity code is the same as the commodity code of the commodity record 81R stored in the commodity database 81. The sales position is information for specifying a position of the commodity shelf R in which commodities to be recommended are displayed. The voice information is information indicating voice of content to notify the shopper of information on the commodity to be recommended. For example, voice having content "XXX (commodity name) recommended to customer is selling on out shelf" is set as the voice information. The image information is information indicating the image of the commodity to be recommended. For example, the image is an appearance image of commodity. The provision condition is information indicating a condition for providing the information of the commodity to be recommended to the shopper. For example, the condition is decided from characteristics information and action information of the shopper. The characteristics information is sex, age, or the like of the shopper. The action information is the information of the commodity already input to the shopping cart E by the shopper or a movement history in the sales place S1, that is, the flow line.

In the additional information record 83R, both the voice information and the image information are not necessarily recorded. At least the voice information may be recorded.

Figure 8:
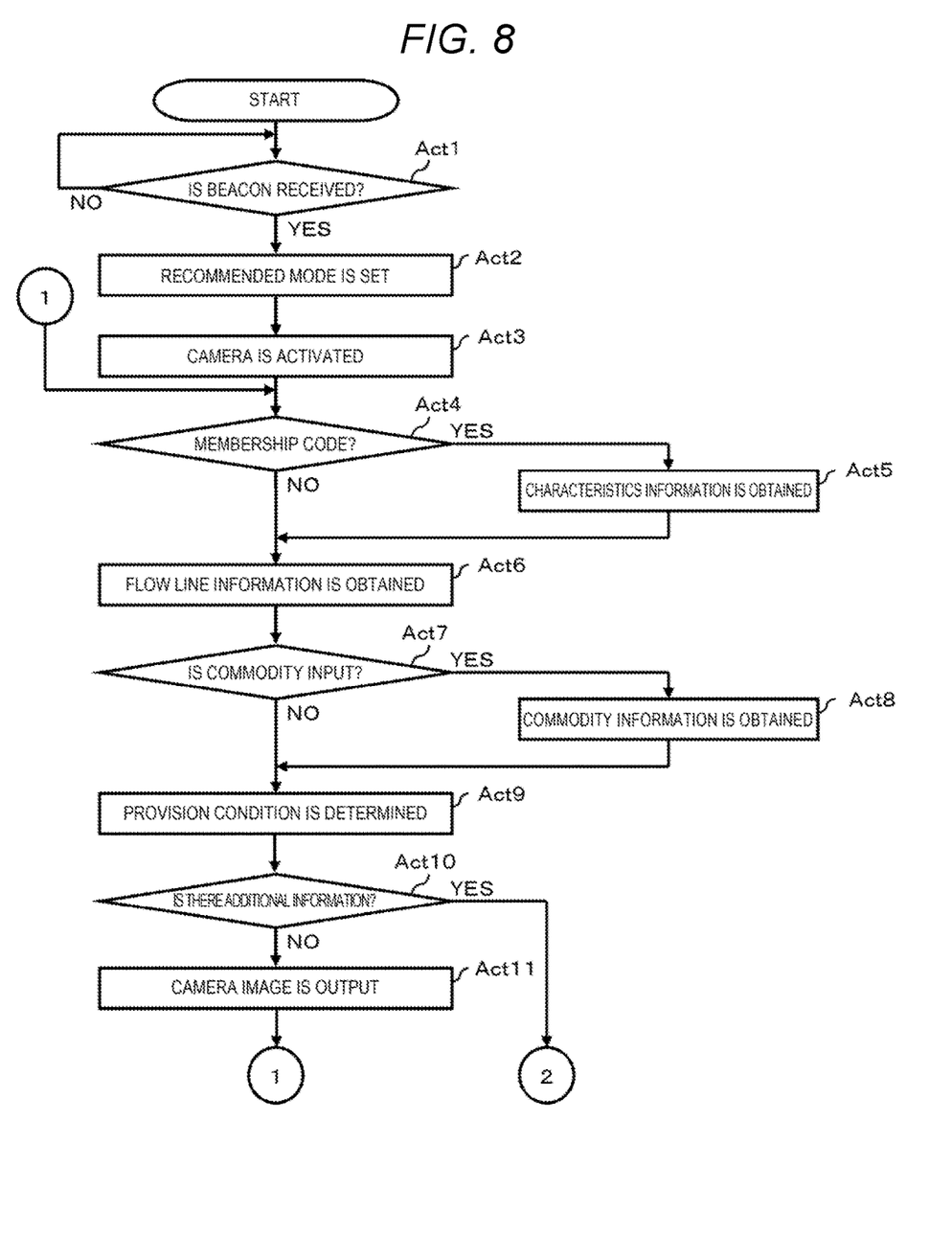
FIG. 8 is a flowchart illustrating an order of a control process performed by a processor of a cart terminal according to a control program.
Figure 9:
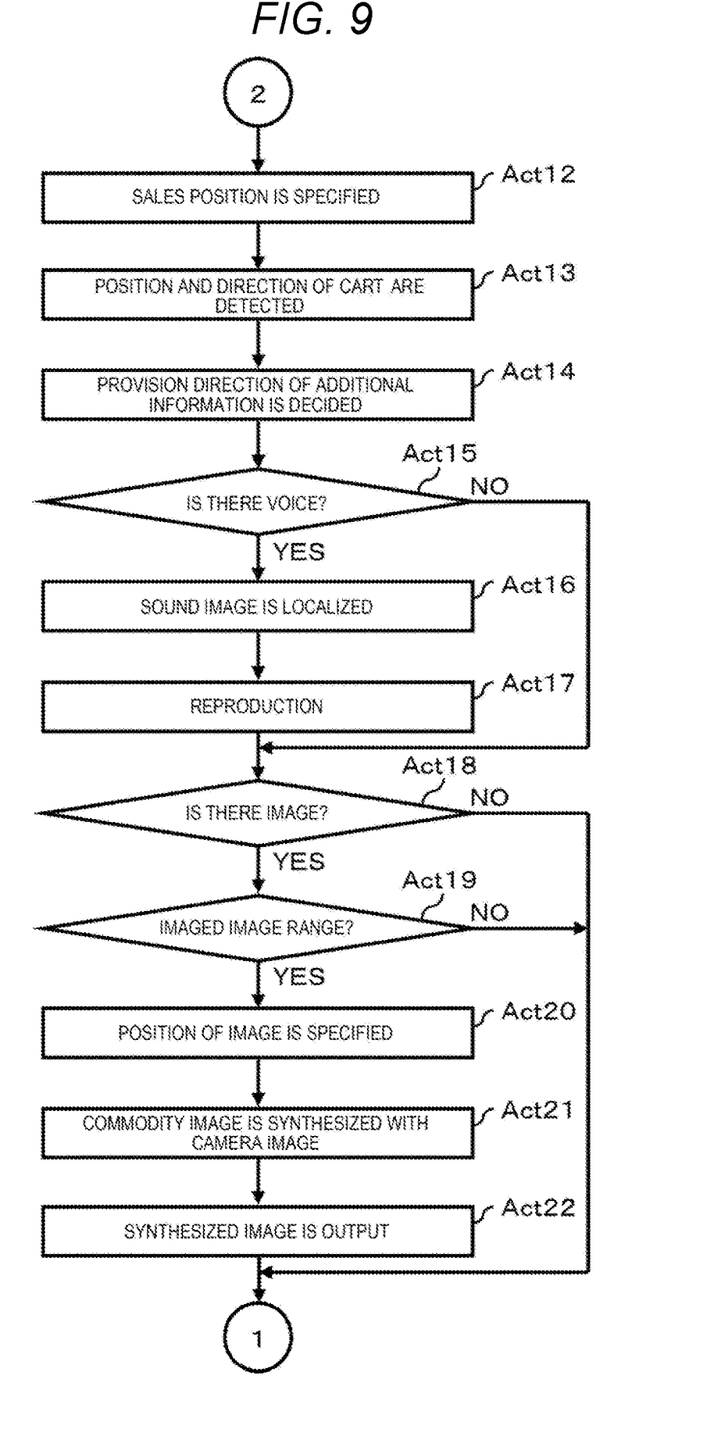
FIG. 9 is another flowchart illustrating the order of a control process performed by the processor of the cart terminal according to the control program.

FIG. 8 and FIG. 9 are flowcharts illustrating an order of control processes performed according to a control program by the processor 101 of the cart terminal 10. The control program is recorded in the main memory 102 or the auxiliary storage device 103. Contents of processes illustrated in FIG. 8 and FIG. 9 and explained below are only examples, and a process procedure and process contents thereof are not particularly limited as long as similar results can be obtained. Hereinafter, flowcharts of FIG. 8, and FIG. 9, and an operation of the cart terminal 10 attached to the cart C taken out by the shopper from the cart storage place S2 will be described.

The processor 101 waits for receiving the beacon signal as Act 1. While the cart C is in the cart storage area, the beacon signal is not received in the transmission and reception circuit 104. When the shopper enters the sales place S1 by operating the cart C, the transmission and reception circuit 104 can receive at least one beacon signal transmitted from the transmitter B. When it is confirmed that the beacon signal is received in the transmission and reception circuit 104 (Act 1, YES), and the processor 101 proceeds to Act 2.

In Act 2, the processor 101 sets the operation mode to the recommendation mode. Accordingly, the processor 101 activates the camera 30 by controlling the image processing circuit 106 as Act 3, and proceeds to Act 4. By activating the camera 30, imaging starts by the camera 30. Accordingly, the image of the reality space is taken into the image processing circuit 106 in the movement direction of the cart C.

Here, the computer which is the main of the processor 101 configures a check unit that checks whether or not the cart C that is a moving object enters an inside from the sales place S1 by the process of Act 1. Accordingly, the computer switches the recommendation mode to a condition that the cart enters within the sales place S1, that is, the operation mode of the cart terminal 10 to a mode for providing information, by a process of Act 2.

In Act 4, the processor 101 determines whether or not to input the membership code. When the membership code is not input (Act 4, NO), the processor 101 proceeds to Act 6.

When the card number of the point card or the membership card by the card reader 109, the processor 101 detects the membership code from the card number. When the membership code is detected (Act 4, YES), the processor 101 proceeds to Act 5.

In Act 5, the processor 101 reads the member record 82R including the membership code by searching for the member database 82 with the membership code. Accordingly, the processor 101 obtains the characteristics information of sex and age from the member record 82R. If the characteristics information of the member can be obtained, the processor 101 proceeds to Act 6.

In Act 6, the processor 101 obtains flow line information of the shopper. That is, the processor 101 measures the movement direction (angle) of the cart C and the amount of movement (distance) in real time based on a valued measured by the sensor group 108, and obtains the flow line information of the cart C, that is, the flow line information of the shopper by integrating the movement direction and the amount of movement. If the flow line information of the shopper can be obtained, the processor 101 proceeds to Act 7.

In Act 7, the processor 101 determines whether or not the commodity is input to the shopping cart E. When the commodity is input to the shopping cart E, the data of the RFID tag attached to the commodity is read by the RFID reader 105. When the data of the RFID tag is not read, the commodity is not input to the shopping cart E. When the commodity is not input to the shopping cart E (Act 7, NO), the processor 101 proceeds to Act 9.

When the data of the RFID tag is read, at least one commodity is input to the shopping cart E. When the commodity is input to the shopping cart E (Act 7, YES), the processor 101 proceeds to Act 8.

In Act 8, the processor 101 obtains the commodity information of the commodity that is input to the shopping cart E. That is, the processor 101 detects the commodity code from the data of the RFID tag read by the RFID reader 105. Accordingly, the processor 101 obtains the commodity information such as the commodity name, the unit price, and commodity classification of the commodity record 81R in which the commodity code is set, by searching for the commodity database 81 with the commodity code. At this time, when the data of two or more RFID tags are read by the RFID reader 105, a process same as the above-described process performs for each data. In this manner, if the commodity information of the commodity input to the shopping cart E can be obtained, the processor 101 proceeds to Act 9.

In Act 9, the processor 101 determines the presence or absence of the additional information satisfying the provision condition. That is, the processor 101 searches for the additional information database 83 by using the characteristics information obtained by the process of Act 5, the flow line information obtained by the process of Act 6, and the commodity information obtained by the process of Act 8. The characteristics information is the sex, the age, and the like of the shopper. The flow line information is a route to the sales place S1 where the shopper moves. The commodity information is the information of the commodity input to the shopping cart E of the cart C by the shopper. The processor 101 determines the presence or absence of the additional information record 83R in which the provision condition satisfying the characteristics information, the flow line information, and the commodity information is set as Act 10. When a corresponding additional information record 83R cannot be detected (Act 10, NO), the processor 101 proceeds to Act 11.

In Act 11, the processor 101 outputs the image processed in the image processing circuit 106, that is, the image in the reality space imaged by the camera 30 to the touch panel 107, and displays the output image on a screen of the touch panel 107. Then, the processor 101 returns to Act 4.

Meanwhile, when the corresponding additional information record 83R cannot be detected (Act 10, YES), the processor 101 proceeds to Act 12 of FIG. 9. The provision condition may not satisfy the overall of the characteristics information, the flow line information, and the commodity information. The processor 101 calculates a satisfaction level for each provision condition, and detects the additional information record 83R in which the provision condition having the highest satisfaction level is set. Alternatively, the processor 101 may detect the additional information record 83R in which the closest provision condition is set with respect to the current position of the cart C, in consideration with the provision condition and the sales position set in the additional information record 83R.

In Act 12, the processor 101 obtains the sales position of the commodity to be recommended from a corresponding additional information record 83R. Accordingly, the processor 101 proceeds to Act 13.

In Act 13, the processor 101 obtains the current position of the cart C by the beacon signal received in the transmission and reception circuit 104. In addition, the processor 101 specifies the movement direction of the cart C from a value measured by a sensor group. In this manner, if the sales position of the commodity to be recommended, the current position of the cart C, and the movement direction can be specified, the processor 101 proceeds to Act 14. The process of Act 12 and the process of Act 13 may be reversed.

In Act 14, the processor 101 decides a provision direction of the additional information. That is, the processor 101 calculates angles in a horizontal direction and a vertical direction required for the shopper's sight line which is at the current position of the cart C and faces the movement direction of the cart C to face to the sales position of the commodity to be recommended, and sets the calculated angle as the provision direction of the additional information. In this manner, if the provision direction of the additional information can be decided, the processor 101 proceeds to Act 15. Here, the processor 101 configures a decision unit that decides a direction of providing the voice information or the image information from a relationship between the position of the cart C, and the movement direction and a position in the sales place S1 of the commodity to be recommended, to the cart C by processes of Act 12 to Act 14.

In Act 15, the processor 101 determines whether or not the additional information record 83R includes the voice information. When the voice information is not included (Act 15, NO), the processor 101 proceeds to Act 18. When the voice information is included (Act 15, YES), the processor 101 proceeds to Act 16.

In Act 16, the processor 101 localizes the virtual sound image in the provision direction decided by a process of Act by controlling the virtual sound image localization processing circuit 111. Furthermore, the processor 101 controls the virtual sound image localization processing circuit 111 to reproduce voice of the voice information from the virtual sound image by the sound source 70 and a pair of left and right speakers 60L and 60R as Act 17. Then, the processor 101 proceeds to Act 18. With this, voice of the voice information that recommends the commodity is heard in the direction of the commodity shelf R in which the commodity to be recommended is sold, to the shopper operating the cart C by the voice reproduced from the pair of left and right speakers 60L and 60R. Here, the processor 101 configures a sound control unit that controls the sound output unit to localize a sound image according to the voice information in a direction decided by performing processes of Act 16 and Act 17 in cooperation with the virtual sound image localization processing circuit 111.

In Act 18, the processor 101 determines whether or not the additional information record 83R includes the image information. When the image information is not included (Act 18, NO), the processor 101 returns to Act 4. When the image information is included (Act 18, YES), the processor 101 proceeds to Act 19.

In Act 19, the processor 101 determines whether or not the provision direction decided in Act 14 is in a range of the image imaged by the camera 30. In the present embodiment, it is possible to specify the current position of the cart C and the movement direction in Act 13. Accordingly, a range of an imaged image can be specified from an angle of view of the camera that images the movement direction of the cart C. Here, the processor 101 configures a determination unit that determines whether or not the direction decided by a process of Act 19 is in the range of the image imaged by the camera 30.

When the provision direction is outside the range of the imaged image (Act 19, NO), the processor 101 returns to Act 4. On the other hand, when the provision direction is in the range of the imaged image (Act 19, YES), the processor 101 proceeds to Act 20.

In Act 20, the processor 101 specifies a display position of the image by the image information to a position of the provision direction decided in the process of Act 14. Accordingly, the processor 101 synthesizes the image of the image information with the image of the reality space imaged by the camera 30 by controlling the image processing circuit 106, as Act 21. At this time, the image processing circuit 106 combines the image of the image information to be displayed at a position specified in a process of Act 20 of the image of the reality space. When the synthesis of the image is completed, the processor 101 proceeds to Act 22. Here, when the direction decided by performing processes of Act 20 and Act 21 in cooperation with the image processing circuit 106 is in the range of the image imaged by the camera 30, the processor 101 configures a synthesis unit that synthesizes the image of the commodity to be recommended with the decided direction of the image imaged by the camera 30.

In Act 22, the processor 101 outputs an image obtained by synthesizing the image of the image information with the image processed by the image processing circuit 106, that is, the image in the reality space imaged by the camera 30 on the touch panel 107, and causes to display the image on a screen of the touch panel 107. Then, the processor 101 returns to Act 4. Here, the processor 101 configures an image control unit that controls the synthesized image to be displayed on the touch panel 107, by a process of Act 22.

According to the present embodiment, the voice of the voice information for recommending the commodity is heard in the direction of the commodity shelf R in which the commodity to be recommended is sold to the shopper turning around the sales place S1 by operating the cart C. Accordingly, the shopper can easily specify whether the commodity to be recommended is displayed on the commodity shelf R in which direction.

In addition, according to at least one embodiment, the image imaged by the camera 30, that is, the image indicating the reality space in the movement direction of the cart C is displayed on the touch panel 107 of the cart terminal 10 in real time. Accordingly, when the voice of the voice information for recommending the commodity from, for example, the front, the shopper can confirm the commodity shelf R or the like in a direction which can hear the voice from the image of the touch panel 107. In addition, when the voice of the voice information for recommending the commodity can be heard from, for example, the back, by setting the cart C in a direction in which the voice is heard, it is possible to confirm the commodity shelf R or the like in a direction in which the voice is heard from the image of the touch panel 107.

Moreover, according to the present embodiment, when the image in the reality space imaged by the camera 30 includes the commodity shelf R in which the commodity to be recommended is sold, the image of the commodity to be recommended is displayed in the direction of the commodity shelf R. Accordingly, the shopper can visually confirm a direction in which the commodity to be recommended is sold.

In addition, according to at least one embodiment, the shopper only moves the cart C from the cart storage place S2 to the sales place S1 such that the cart terminal 10 automatically enters the recommendation mode. Accordingly, the shopper can obtain information on the recommended commodity without selecting the recommendation mode manually. In addition, in a store side, since the cart terminal 10 is automatically set to the recommendation mode and the information of the commodity to be recommended to the shopper can be automatically, which leads to sales promotion.

In the above-described embodiments, the following at least one modification embodiment is conceivable. In the at least one embodiment, the processor 101 determines whether or not the provision direction decided in Act 14 is in the range of the image imaged by the camera 30, in Act 19 of FIG. 9. Accordingly, when the decided provision direction is in the range of the image, the processor 101 specifies the display position of the image based on the image information is determined to a position of the decided provision direction in Act 20. Regarding this point, processes of Act 19 and Act 20 may be omitted. That is, when the additional information record 83R includes the image information (Act 18, YES), the processor 101 synthesizes the image of the image information with the image of the reality space imaged by the camera 30. Even if such a configuration is adopted, the shopper has an effect that it is visually confirmed whether the commodity to which information is provided by voice is what kind of the commodity.

In at least one embodiment, the cart terminal 10 for providing the information of the commodity to be recommended to the shopper shopping by using the cart C is exemplified as the information providing apparatus. The information providing apparatus is not limited to the above-described cart terminal 10. For example, provision of the information by the voice is very effective for a visually impaired. Accordingly, for the shopper with visual impairment, it is also possible to realize the cart terminal notifying voice information such as whether the commodity in a shopping list registered by the shopper is sold on the commodity shelf in which direction and whether there is a person in the vicinity of the cart C, as a modification example of the embodiment.

In addition, the moving object is not limited to the cart C. For example, a forklift used in a warehouse or the like may be adopted as the moving object. In this case, for a user operating the forklift, it is conceivable to notify that a desired article is placed by voice in a shelf direction where the desired article is placed, it is possible to notify. In addition, it is also possible to configure the moving object as a person such as the shopper and to configure a headphone, a tablet terminal with speaker built in, and the like used by this person as the information providing apparatus.

Transfer of the cart terminal 10 as the information providing apparatus is generally performed in a state where a program such as the control program is stored in the main memory 102 or the auxiliary storage device 103. However, the embodiment is not limited thereto, in a state where the program is not stored in the main memory 102 or the auxiliary storage device 103, the program may be transferred. Accordingly, in this case, the control program or the like individually transferred from the cart terminal 10 is written to a writable storage device of the cart terminal 10 in accordance with an operation of a user or the like. The above-described another control program may be rewritten. The transfer of the control program and the like can be performed by recording on a removable recording medium or by communication via a network the control program. The recording medium may be in any form as long as the recording medium can store a program such as a CD-ROM and a memory card and the device can be read. In addition, a function obtained by installing or downloading a program may be one which realizes the function in cooperation with an operating system (OS) or the like inside the device.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information providing apparatus comprising:
   at least one computer configured to:
      detect a position and a movement direction of a moving object in an area in which an article, corresponding to information that is provided, is disposed; and
      decide a direction in which the information is provided to the moving object from a relationship between the position of the moving object, the movement direction of the moving object, and a position in the area of the article; and
   a sound control circuit configured to perform virtual sound image localization processing and control a sound output attached to the moving object using a plurality of speakers, the sound output being localized according to the information in the direction decided by the at least one computer.

2. The apparatus according to claim 1, wherein the at least one computer is configured to cause an image imaged by an imaging device attached to the moving object to be displayed on an image display attached to the moving object.

3. The apparatus according to claim 2, wherein the at least one computer is configured to synthesize an image of the article with the image imaged by the imaging device,
   wherein the at least one computer is configured to cause the image synthesized to be displayed on the image display.

4. The apparatus according to claim 3, wherein the at least one computer is configured to determine whether or not the direction decided is in a range of the image imaged by the imaging device,
   wherein the at least one computer is configured to synthesize the image of the article with the direction decided when the direction decided is in the range of the image imaged by the imaging device.

5. The apparatus according to claim 1, wherein the at least one computer is configured to check whether or not the moving object detected enters an inside region of the area from a region outside of the area,
   wherein the at least one computer is configured to switch a mode to a mode of providing the information under a condition that the moving object enters the inside region of the area.

6. The apparatus according to claim 1, wherein the plurality of speakers are directional speakers.

7. The apparatus according to claim 1, wherein the imaging device includes a camera.

8. The apparatus according to claim 1, wherein the moving object is a least one of a cart or a forklift.

9. An information providing method comprising:
   detecting a position and a movement direction of a moving object in an area in which an article, corresponding to information that is provided, is disposed;
   deciding a direction in which the information is provided to the moving object from a relationship between the position of the moving object, the movement direction of the moving object, and a position in the area of the article; and
   performing virtual sound image localization processing and controlling a sound output attached to the moving object using a plurality of speakers, the sound output being localized according to the information in the decided direction.

10. A cart comprising:
    a frame;
    a cart terminal connected to the frame;
    a left speaker electrically connected to the cart terminal; and
    a right speaker electrically connected to the cart terminal,
    the cart terminal having at least one computer configured to:
       detect a position and a movement direction of a moving object in an area in which an article, corresponding to information that is provided, is disposed; and
       decide a direction in which the information is provided to the moving object from a relationship between the position of the moving object, the movement direction of the moving object, and a position in the area of the article; and
    a sound control circuit configured to perform virtual sound image localization processing and control a sound output attached to the moving object using a plurality of speakers, the sound output being localized according to the information in the direction decided by the at least one computer.

11. The cart according to claim 10, wherein the at least one computer is configured to cause an image imaged by an imaging device attached to the cart to be displayed on a display of the cart terminal.

12. The cart according to claim 11, wherein the at least one computer is configured to synthesize an image of the article with the image imaged by the imaging device,
    wherein the at least one computer is configured to cause the image synthesized to be displayed on the display.

13. The cart according to claim 12, wherein the at least one computer is configured to determine whether or not the direction decided is in a range of the image imaged by the imaging device,
    wherein the at least one computer is configured to synthesize the image of the article with the direction decided when the direction decided is in the range of the image imaged by the imaging device.

14. The cart according to claim 10, wherein the at least one computer is configured to check whether or not the moving object detected enters an inside region of the area from a region outside of the area,
    wherein the at least one computer is configured to switch a mode to a mode of providing the information under a condition that the moving object enters the inside region of the area.

15. The apparatus according to claim 10, wherein the plurality of speakers are directional speakers.

16. The apparatus according to claim 10, wherein the imaging device includes a camera.

* * * * *